United States Patent [19]

Schreiber

[11] Patent Number: 5,424,903

[45] Date of Patent: Jun. 13, 1995

[54] INTELLIGENT POWER SWITCHER

[75] Inventor: Paul T. Schreiber, Fort Worth, Tex.

[73] Assignee: Tandy Corporation, Fort Worth, Tex.

[21] Appl. No.: 3,138

[22] Filed: Jan. 12, 1993

[51] Int. Cl.$^6$ .............................................. H02J 3/14
[52] U.S. Cl. .................................... 361/166; 307/40; 307/41
[58] Field of Search ................................ 307/38–41; 361/166

[56] References Cited

U.S. PATENT DOCUMENTS

| | | | |
|---|---|---|---|
| Re. 33,134 | 8/1990 | Cowles | 318/98 |
| 3,984,699 | 10/1976 | Bailey. | |
| 4,153,936 | 5/1979 | Schmitz et al. . | |
| 4,213,059 | 7/1980 | Deacey. | |
| 4,520,274 | 5/1985 | Stants. | |
| 4,674,031 | 6/1987 | Siska, Jr. | 307/38 X |
| 4,719,364 | 1/1988 | Pequet et al. . | |
| 4,736,116 | 4/1988 | Pavlak, Jr. et al. . | |
| 4,769,555 | 9/1988 | Pequet et al. . | |
| 4,890,212 | 12/1989 | Kumon et al. . | |
| 5,278,771 | 1/1994 | Nyenya | 307/38 X |

OTHER PUBLICATIONS

Motorola Semiconductor Technical Data Sheet for the MC6804J1, no publication date provided.

Primary Examiner—A. D. Pellinen
Assistant Examiner—Fritz M. Fleming
Attorney, Agent, or Firm—Haynes and Boone

[57] ABSTRACT

An intelligent power switching system for controlling the electrical connection of a power source to each of a plurality of outputs, such as personal computer components or electronic entertainment equipment. Switch circuitry is coupled to relay circuitry for generating signals responsive to user commands to select an "on" or "off" state with respect to each output. A processor receives switching signals and generates control signals to effect actuation of the relays. Responsive to user programming commands, the processor stores the switching signals, their sequence and the time delay between their generation. Responsive to a subsequent abbreviated user "power-on" command, the processor generates control signals by reading the stored switching signals, their sequence and time delay, and automatically actuates the relays with respect to each output in the same order and with the same time delay as defined by the user programming commands. A "power off" command causes the relays to be actuated in the reverse order.

25 Claims, 3 Drawing Sheets

INTELLIGENT POWER SWITCHER

FIELD OF THE INVENTION

The present invention relates generally to the field of power control apparatus for electrical and electronic equipment, and more particularly to apparatus for automatic, time-delayed sequencing of power to such equipment.

BACKGROUND OF THE INVENTION

With regard to many electronic and electrical systems, such as computer and home entertainment systems, electrical power must be applied to the components of the system according to a particular sequence to avoid causing undue stress and possible damage to them. For example, in many computer systems, power must first be applied to the computer before being applied to the monitor, because the computer supplies the monitor with horizontal and vertical synchronization pulses necessary to prevent the free running of the monitor's horizontal and vertical oscillators. Allowing the oscillators to operate in an unsynchronized condition can result in undue stress to the oscillators and hard failure of the monitor.

Similarly, power must usually be applied to the computer before being applied to the printer. Otherwise, the printer might apply power to the computer and potentially cause the computer to fail to initialize when power is subsequently applied to it. Consequently, the order and timing of the application of power to and removal of power from certain systems must be carefully controlled so as to avoid damaging the system components. It is often essential to proper power up and operation of an electronic or electrical system that power be applied to a controller component, such as the computer, before being applied to subordinate components, such as the monitor or the printer. For the same reasons, it will usually be desirable for the components to be turned off in the reverse order.

One solution is for the system user to turn on the components manually, allowing sufficient time after power up of the controller component to ensure that it has reached a stable state before applying power to the subordinate components. This method is generally unsatisfactory, because the time delay interval is difficult to control and duplicate manually, and further, because it may be desirable to ensure that the power up and power down of the system always occur according to a particular sequence.

Another solution is to use time delay relays (TDRs) to provide a predetermined, fixed time delay between application of power to one component and the next. This method is also unsatisfactory, as well as being very expensive. TDRs are capable only of providing a fixed, or at best, a narrowly adjustable, time delay. Furthermore, the power up delay is exactly equal to the power down delay, a condition which may be undesirable in certain cases. Finally, TDRs have no memory means in which a preferred power up sequence can be stored; therefore, the sequence cannot easily be changed by a user.

SUMMARY OF THE INVENTION

The foregoing problems are solved and a technical advance is achieved by method and apparatus for the automatic, time-delayed sequencing of power application to and removal from electronic and electrical systems. In a departure from the art, a user programmable controller automatically switches each of a plurality of outlets connected in series between "on" and "off" states according to a desired sequence and time delay between the switching of each outlet. The controller is easily programmed by manual actuation of switches associated with each outlet, whereupon the controller stores the sequence and time delay between actuation of each switch. The user subsequently actuates a master power switch to implement the programmed sequence and time delay for power-up of components connected to the outlets and to implement the programmed sequence in the reverse order. The present arrangement is especially useful for controlling power application to a computer, monitor, printer or other computer system components connected to the outlets.

An intelligent power switching system of the present invention comprises a power strip, which has six AC outlets for supplying power to electronic and electrical devices via electrical cords, and a remote control unit, which has six momentary switches labeled AUX1, AUX2, PRINTER, MONITOR, COMPUTER, and POWER, and six LEDs, each of which correspond to a particular momentary switch. All but one of the AC outlets on the power strip are programmable and each programmable outlet is associated with a particular switch-LED pair on the remote control. Power is supplied to the components of an electronic or electrical system, such as a computer system, via the programmable outlets. The non-programmable outlet may be used to supply power to a non-system device, such as a lamp.

To program the system, the switches labeled AUX1, AUX2, PRINTER, MONITOR, and COMPUTER are actuated in the order in which power is to be applied to the component associated with that switch. As each switch is actuated, the corresponding LED lights up, indicating that power is being applied to the component. The order in which the switches are actuated and the time delay between actuation of successive switches are stored in the memory of a microprocessor located in the power strip.

During subsequent use, only the POWER switch must be actuated to apply power to the system according to the programmed sequence or to remove power from the system in the reverse order of that programmed. To reprogram the switching system, the user enters a new sequence by actuating the appropriate switches in the manner previously described. Power is applied to a device connected to the non-programmable outlet immediately upon actuation of the POWER switch.

In one aspect, a capacitor and diode combination placed in series with the microprocessor's power supply enables the programmed sequence to be retained in the random access memory (RAM) of the microprocessor during short power outages.

In a preferred embodiment, a power switching apparatus provides for controlling the electrical connection of a power source via conductive lines to each of a plurality of outputs. The apparatus includes relay circuitry connected in series on the lines for actuation, with respect to each output, between a first state in which the output is disconnected from the power source and a second state in which the output is connected to the power source. Switch circuitry is coupled to the relay circuitry for generating signals responsive to user commands to select the state with respect to each output. A processor receives the switching signals and generates control signals to effect actuation of the relay circuitry. Responsive to user programming commands, the processor stores the switching signals, their sequence and the time delay between their generation. Responsive to a subsequent abbreviated user "power-on" command, the processor generates control signals by reading the stored switching signals, their sequence and time delay, for automatically actuating the relay circuitry with respect to each output in the same order and with the same time delay as defined by the user programming commands. When the abbreviated user command is a "power-off" command, the relay circuitry is actuated with respect to each output in the reverse order.

A technical advantage achieved with the invention is the facility with which a user is able to program a time-delayed sequence of power application to multiple electronic devices.

Another technical advantage achieved with the invention is the ability to initiate repeatedly the programmed sequence with an abbreviated command, such as with a single switch actuation.

A further technical advantage achieved with the invention is the automatic programming of the power-off sequence, which is implemented by reversing the order of the power-on sequence and setting the delay to some fixed interval of time.

DETAILED DESCRIPTION OF THE PREFERRED EMBODIMENT

Figure 1:
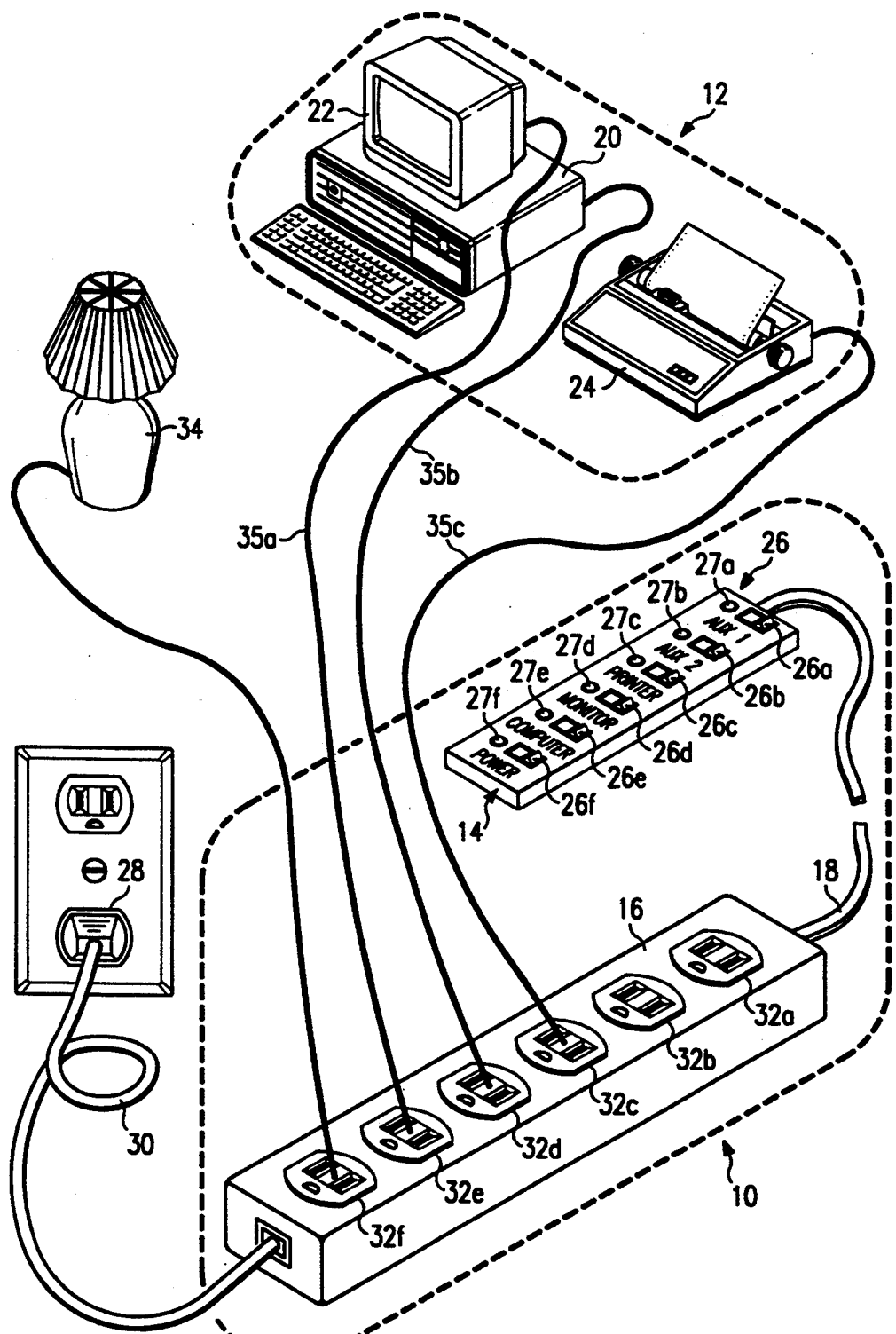
FIG. 1 is a perspective view of an intelligent power switching system of the present invention in which a lamp and computer components are connected to the system outlets.

In FIG. 1, the reference numeral 10 designates an intelligent power switching system of the present invention. In one embodiment, the system 10 is used to control the order in which power is applied to and removed from one or more personal computer components 12. Further, the system 10 controls the timing of the application of power to each of the components 12 relative to the other components. The system 10 comprises a remote control unit 14, a power strip 16, and a multiconductor cable 18 that connects the remote control unit 14 to the power strip 16. The components 12 include a computer 20, a monitor 22, and a printer 24. Each of the components 12 are well known in the art and will not be discussed further.

The remote control unit 14 of the system 10 comprises a keyboard 26 with six momentary switches or buttons 26a-26f labeled AUX1, AUX2, PRINTER, MONITOR, COMPUTER, and POWER, respectively, and six light emitting diodes (LEDs) 27a-27f that correspond to the switches 26a-26f, respectively. The switches 26a-26e are used to program the desired power up sequence into the power strip 16 and the switch 26f is used to initiate the application or removal of power according to the programmed sequence. The LEDs 27a-27e serve to indicate when power is being applied to a particular system component and the LED 27f serves to indicate that the POWER switch 26f has been actuated. The remote control unit 14 may be affixed to the side of the monitor 22 or placed in a convenient location near the computer 20.

The power strip 16 is connected via an electrical cord 30 to a wall outlet 28 for providing 110 volt alternating current (VAC) to six outputs or outlets 32a-32f. The outlets 32a-32e are programmable. The outlet 32f is nonprogrammable and is be used to supply electrical power to a lamp 34 or other non-system device. The power strip 16 may be placed on the floor adjacent the wall outlet 28 or in another convenient location.

Power is applied to the the computer 20, the monitor 22, and the printer 24 respectively via the outlets 32c-32e and the electrical cords 35a-35c. It is understood that additional components (not shown) may be plugged into the outlets 32a, 32b via additional electrical cords (not shown).

Figure 2:
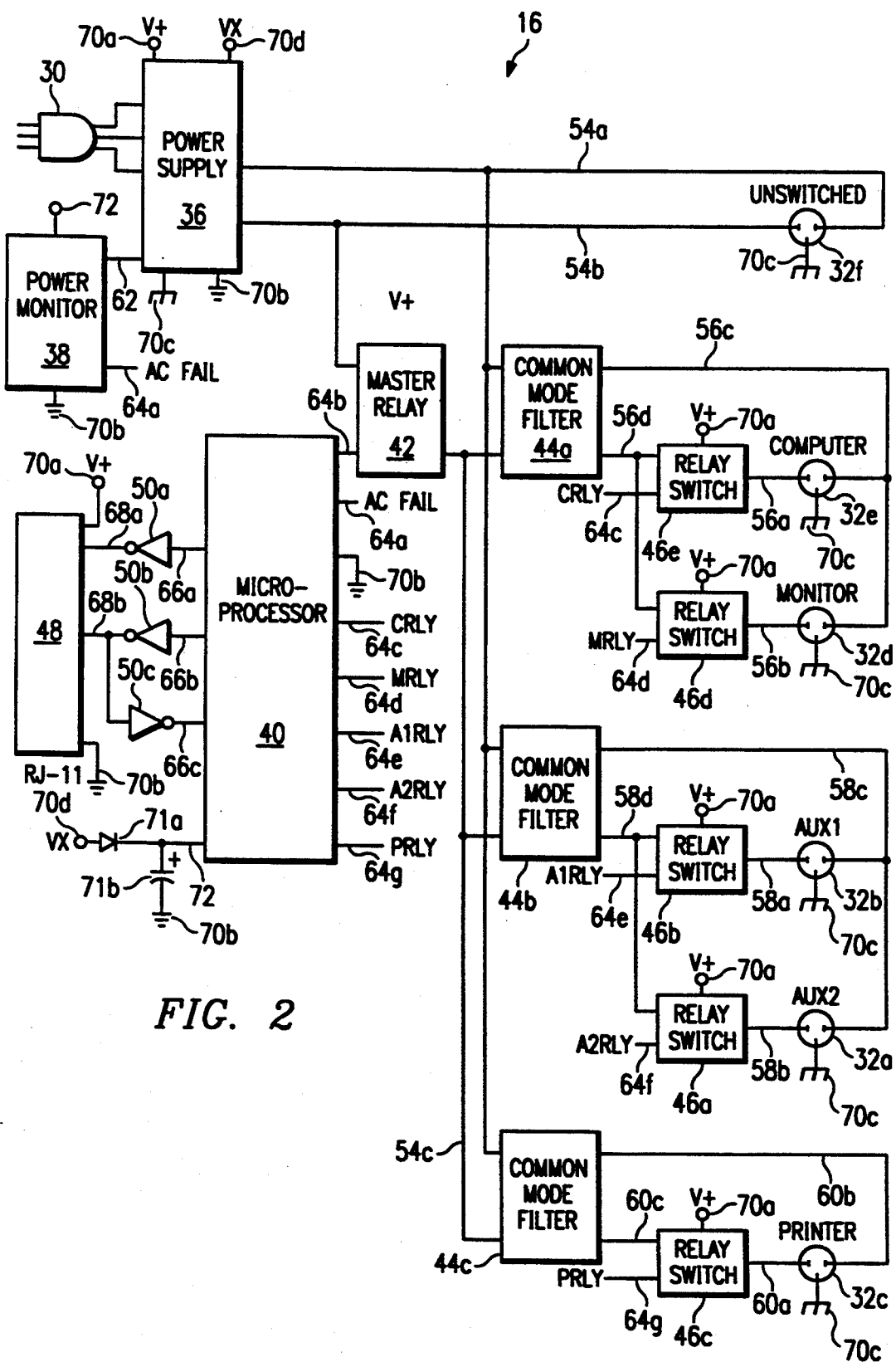
FIG. 2 is a functional block diagram of the power strip of the system of FIG. 1.

Referring to FIG. 2, a functional block diagram of the power strip 16 of FIG. 1 is illustrated. The power strip 16 includes a power supply 36, a power monitor 38, a microprocessor 40, a master relay 42, three common mode filters 44a-44c, and five normally-open relay switches 46a-46e. The power strip 16 also includes the six outlets 32a-32f, a standard RJ-11 connector 48, and three inverters or buffers 50a-50c.

The power supply 36 is supplied with 110 VAC and an earth ground via the electrical cord 30. The outlet 32f is hardwired to 110 VAC via the power supply 36 and power lines 54a, 54b. 110 VAC is also supplied to the master relay 42 via the line 54b and to one input of each of the common mode filters 44a-44c via the line 54a. The other input of each of the filters 44a-44c is connected to an output of the master relay 42 via a line 54c. Consequently, the flow of electricity to the common mode filters 44a-44c is regulated by the master relay 42.

The outlet 32e is connected to the relay 46e via a line 56a and the outlet 32d is connected to the relay 46d via a line 56b. The outlet 32e and the relay 46e are connected in parallel with the outlet 32d and the relay 46d to the outputs of the common mode filter 44a via two lines 56c, 56d. Similarly, the outlet 32b is connected to the relay 46b via a line 58a and the outlet 32a is connected to the relay 46a via a line 58b. The outlet 32b and the relay 46b are connected in parallel with the outlet 32a and the relay 46a to the outputs of the common mode filter 44b via two lines 58c, 58d. The outlet 32c is connected to the relay 46c via a line 60a, and the outlet 32c and the relay 46c are connected in series to the outputs of the filter 44c via two lines 60b, 60c. In this manner, the power supply 36 indirectly supplies 110 VAC to the outlets 32a-32e via the master relay 42, the filters 44a-44c, and the relays 46a-46e.

The power monitor 38 monitors the power supply 36 via a line 62. The monitor 38 is also connected to the microprocessor 40 via an AC FAIL line 64a that is used by the monitor 38 in the event of 110 VAC failure to indicate that condition to the microprocessor 40. The microprocessor 40 is connected to the master relay 42 and to the relay switches 46a-46e by control lines 64b-64g, respectively. The microprocessor 40 controls the flow of electricity to the outlets 32a-32e by sending A2RLY, A1RLY, PRLY, MRLY and CRLY control signals to relays 46a-46e, respectively.

The microprocessor 40 is connected to the input of the buffers 50a-50b and to the output of the buffer 50c by lines 66a-66c, respectively. The output of the buffer 50b and the input of the buffer 50c are tied together and are connected to the jack 48 via a line 68b. The output of the buffer 50a is connected to the jack 48 via a line 68a. It is understood that the buffers 50a–50c serve to drive the cable 18.

A positive 12.0 volts (V), V+ from the power supply 36 is supplied to the jack 48, the master relay 42 and the relay switches 46a–46e via a line 70a. Similarly, a common ground from the power supply 36 is supplied to the jack 48, the power monitor 38 and the microprocessor 40 via a line 70b. An earth ground from the power supply 36 is supplied to the outlets 32a–32f via a line 70c. Further, a positive 5.6 V from the power supply 36 is supplied to the microprocessor 40 via a line 70d. The 5.6 V is dropped across a diode 71a to provide a positive 5.0 V to the power monitor 38 via a line 72. A large (0.022 farads) capacitor 71b is placed across the 5.0 V potential and is used in combination with the diode 71a to provide short-term power to the microprocessor 40 in the event there is a power failure. As a result, the microprocessor 40 will deactivate the master relay 42, which will simultaneously remove power from the components 12.

It is understood that the power supply 36, the power monitor 38, the microprocessor 40, the master relay 42, the filters 44a–44c, the relay switches 46a–46f and the jack 48 used in the implementation of the present invention are typical of those commonly used in the art and are therefore represented in block rather than schematic form.

Figure 3:
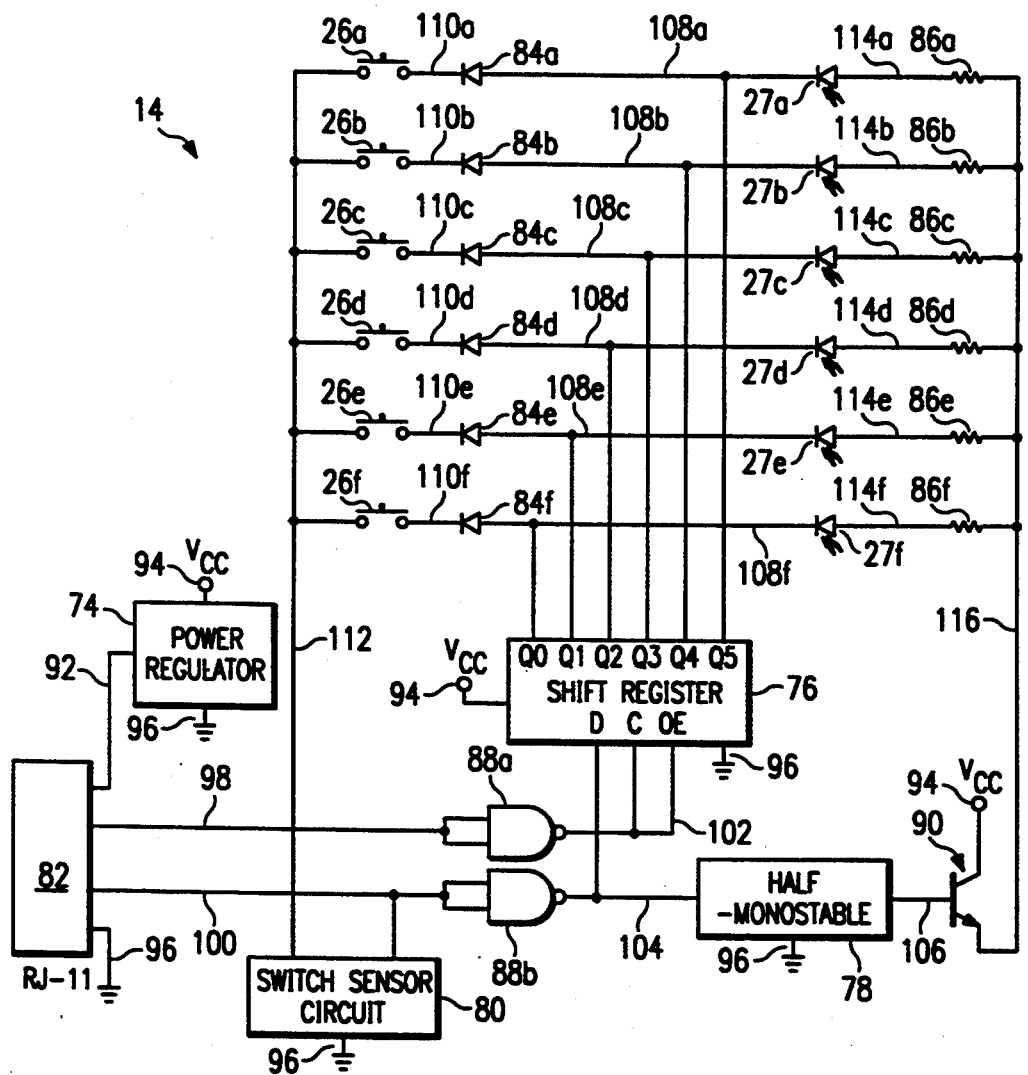
FIG. 3 is a functional block diagram of the remote control unit of the system of FIG. 1.

FIG. 3 is a functional block diagram of the remote control unit 14 of the intelligent power switcher system 10. The remote control unit 14 includes a power regulator 74, an 8-bit serial input-parallel output shift register 76, a half-monostable 78, and a switch sensor circuit 80. The remote control unit 14 also includes a standard RJ-11 jack 82, the momentary switches 26a–26f, six diodes 84a–84f, the LEDs 27a–27f, six resistors 86a–86f, two 2-input NAND gates 88a, 88b and a transistor 90.

The inputs of each of the NAND gates 88a, 88b are tied together, thereby enabling the NAND gates 88a, 88b to function as inverters and as buffers or drivers. The jack 82 supplies a positive 12.0 V to the power regulator 74 via a line 92. The regulator 74 regulates and filters the 12.0 V to a positive 5.0 V, Vcc which is supplied to the shift register 76 and to the emitter of transistor 90 via a line 94. The jack 82 supplies a common ground to the power regulator 74, the shift register 76, the half-monostable 78 and the switch sensor circuit 80 via a line 96. Further, the jack 82 is connected to the inputs of the NAND gates 88a, 88b via a clock line 98 and a sense line 100, respectively. The output of the NAND gate 88a is connected to both the clock pin (C) and the output enable pin (OE) of the shift register 76 via a line 102, and the NAND gate 88b is connected both to the data pin (D) of the shift register 76 and the input of the half-monostable 78 via a line 104. The output of the half-monostable 78 is connected to the base of the transistor 90 via a line 106. The cathodes of the LEDs 27a–27f are respectively connected to the anodes of the diodes 84a–84f and to six output pins (Q0–Q5) of the shift register 76 via six lines 108a–108f. It is understood that output pins Q6 and Q7 of the shift register 76 (not shown) are left unconnected. The anodes of the diodes 84a–84f are connected to one side of the momentary switches 26a–26f, respectively. The other side of each of the switches 26a–26f is connected to the scan input of the switch sense circuit 80 via a common line 112. The anodes of the LEDs 27a–27f are connected to one side of the resistors 86a–86f via six lines 114a–114f, respectively. The other side of each of the resistor 86a–86f is connected via a common line 116 to the collector of the transistor 90.

It is understood that the remote control 14 is connected to the power strip 16 via the cable 18; consequently, the lines 92, 96, 98, 100 of the remote control 14 are connected to the lines 70a, 70b, 68a, 68b of the power strip 16, respectively. It is further understood that the power regulator 74, the shift register 76, the half-monostable 78, the switch sensor circuit 80, and the jack 82 are typical of those commonly used in the art and are therefore illustrated in block rather than schematic form.

In operation, the intelligent power switcher system 10 is used to apply power to and remove power from the components 12 of an electronic system according to a user-programmed sequence. Referring to FIG. 1, power is applied to the components 12 by actuating the switches 26a–26e in the order in which power is to be applied to the various components 12. Assuming, for example, that a user desires power to be applied first to the computer 20, then to the monitor 22, and finally to the printer 24, the user first actuates the switch 26e, corresponding to the computer 20. Upon actuation of the switch 26e, the LED 27e lights up to indicate the application of power to the computer 20. After waiting a sufficient time to allow the computer to boot-up, the user actuates the switch 26d, corresponding to the monitor 22. Upon actuation of the switch 26d, the LED 27d lights up to indicate the application of power to the monitor 22. The user then waits a few seconds for the monitor 22 to reach a steady state before actuating the switch 26c, corresponding to the printer 24. Upon actuation of the switch 26c, the LED 27c lights up to indicate the application of power to the printer 24.

The sequence in which the switches 26c–26e are actuated and the time delay between successive actuation of the switches 26c–26e are stored in the memory of the microprocessor 40. The first time the user actuates the switch 26f after having programmed the power strip 16 in the above manner, power is removed from the components 12 in the reverse order of the programmed sequence. The interval of time between the removal of power from the components may, but need not necessarily, be of a predetermined, fixed length, such as 0.5 seconds.

During subsequent use of the components 12, the user need only actuate the POWER switch 26f to apply power to and remove power from the computer system 12 according to the programmed sequence. To reprogram the strip 16, the user simply enters a new sequence into the system 10, via the remote control unit 14, in the manner previously described.

Referring again to FIG. 3, it is observed that the lines 92, 96 are used to provide a positive 12.0 V and common ground, respectively, from the jack 82 to the remote control 14. The remaining two lines 98, 100 are control lines used by the microprocessor in scanning the switches 26a–26f and in lighting the LEDs 27a–27f. Line 98, driven by a buffer 50a, functions as a clock line. Line 100 functions as a bi-directional data or sense line. Line 100 is split into two signal lines driven by buffers 50b and 50c, respectively.

The scanning function is performed by the microprocessor 40 in the following manner. Initially, six logic zeros (0) are shifted into the shift register. The microprocessor 40 drives line 100 low and then toggles line 98 six times, to form a clock pulse train, which is applied to the C and OE pins of the shift register 76 via line 102. The microprocessor 40 then drives line 100 high for one clock pulse, it being understood that the duration of the clock pulse must be short enough to avoid triggering the half monostable 78 (in the present embodiment, approximately 4 ms). As a result, a logic one (1) is output to Q0 of the shift register 76 and line 108*f* is driven high. The microprocessor 40 then examines the line 100 via inverter 50*c* and the line 60*c*. If switch 26*f* is closed when line 108*f* is driven high, the switch sensor circuit 80 drives line 100 low; otherwise, line 100 remains high. The signal on line 100 is stored in the memory of the microprocessor 40. The microprocessor 40 scans the remaining switches 26*a*–26*e* by applying the clock pulse to the C pin of the shift register 76 via line 98, causing the 1 to be shifted along the Q1–Q5 pins of the shift register 76, sequentially driving the lines 108*e*, 108*d*, 108*c*, 108*b*, 108*a* high, and then examining and storing the resulting signal on line 100.

The lighting of the LEDs 27*a*–27*f* is accomplished as follows. The half-monostable 78 controls the flow of current to common LED power line 116 via the transistor 90. When line 100 is driven low for a period of time sufficient to trigger the half-monostable 78, line 106 also goes low and transistor 90 is turned on. As a result, line 116 is driven high, supplying current to the LEDs 27*a*–27*f*. In order to light a particular LED 27*a*–27*f*, the corresponding scan line 108*a*–108*f* must be driven low via the shift register 76. Accordingly, the microprocessor 40 drives line 100 low and applies a clock pulse on line 98. As a result, line 108*f* is driven low. If the LED 27*f* is to remain unlit, the microprocessor 40 adjusts the width of the pulse on line 100 so that it is not of sufficient duration to trigger the half-monostable 78. Consequently, line 116 remains low and no current is supplied to the LEDs 27*a*–27*f*. The process is repeated for each of the remaining LEDs 27*a*–27*e*, with the shift register 76 sequentially driving lines 108*a*–108*e* low and the microprocessor 40 controlling the whether the half-monostable 78 is triggered.

It is understood that the microprocessor 40 does not simultaneously scan the switches 26*a*–26*f* and light the LEDs 27*a*–27*f*, but alternately performs these functions. It is further understood that the scanning/lighting sequence is performed at a rate sufficient to cause the LEDs 27*a*–27*f* to appear to be continuously lighted, although in actuality, they are flashing on and off.

Referring again to FIG. 2, it is understood that the microprocessor 40 alternately uses the lines 66*a* and 66*b* to drive the LEDs 27*a*–27*f* and to sense the closure of the switches 26*a*–26*f*, as previously described. Further, the microprocessor 40 uses the control lines 64*c*–64*h* to control the activation and deactivation of the relay switches 46*a*–46*e* to supply power to, and remove power from, the outlets 32*a*–32*e* according to the programmed sequence stored in the microprocessor 40 random access memory (RAM). As previously described, the AC FAIL control line 64*a* is used by the power monitor 38 to indicate a failure of the 110 VAC to the microprocessor 40. In the event of AC failure, the microprocessor 40 will deactivate the master relay 42 via the control line 64*b*, causing the master relay 42 to simultaneously remove power from the outlets 32*a*–32*e*.

It is understood that the present invention can take many forms and embodiments. The embodiments shown herein are intended to illustrate rather than to limit the invention, it being appreciated that variations may be made without departing from the spirit of the scope of the invention. For example, the system 10 may be implemented using alternative electronic components, rather than as herein described. Further, it will be appreciated that different elements of the system may be embodied as a single integrated chip, or any varying combination of discrete digital or analog components interconnected in a standard manner. The system may be used to supply power to a variety of devices other than components of a computer system. Examples include, inter alia, lighting devices, consumer electronic products such as stereos, players, cable TV arrangements, and other systems.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Power switching apparatus for controlling electrical connection of a power source via conductive lines to each of a plurality of outputs, the apparatus comprising:
   relay means connected in series with said lines for selective actuation, with respect to each said output, between a first power state and a second power state;
   switch means comprising a plurality of switch elements, with at least one of said switch elements corresponding to each said output, operably coupled to said relay means for generating switch signals with respect to each said output responsive to user commands to select from said states with respect to each said output; and
   controller means coupled between said switch means and said relay means responsive to said switch signals for controlling said actuation of said relay means with respect to each said output, storing the sequence and time delay between said generation of said switch signals, and, immediately responsive to at least one subsequent switch signal corresponding to an abbreviated user command, reading said stored switch signals such that said relay means is actuated with respect to each said output according to said stored sequence and time delay.

2. Power switching apparatus for controlling electrical connection of a power source via conductive lines to each of a plurality of outputs, the apparatus comprising:
   relay means connected in series with said lines for selective actuation, with respect to each said output, between a first power state and a second power state;
   switch means comprising a plurality of switch elements, with at least one of said switch elements corresponding to each said output, operably coupled to said relay means for generating switch signals with respect to each said output responsive to user commands to select from said states with respect to each said output; and
   controller means coupled between said switch means and said relay means responsive to said switch signals for controlling said actuation of said relay means with respect to each said output; storing said switch signals, their sequence and the time delay between their generation when said switch signals correspond to a user programming command; and, immediately responsive to at least one subsequent switch signal corresponding to an abbreviated user command, reading said stored switch signals, their sequence and time delay therebetween such that said relay means is actuated with respect to each said output in the same order and with the same time delay therebetween as defined by said user programming command.

3. The apparatus of claim 2 wherein said switch means is operably coupled in series to said controller means.

4. The apparatus of claim 3 wherein said switch means further comprises a visual indicator associated with each said switch element for indicating said state of each said output.

5. The apparatus of claim 4 wherein said visual indicator is a light emitting diode.

6. The apparatus of claim 3 wherein said plurality of switch elements generate switch signals corresponding to said user programming commands.

7. The apparatus of claim 3 wherein said plurality of switch elements comprise momentary contact switches.

8. The apparatus of claim 3 wherein said switch means further comprises a master power switch coupled in parallel with said plurality of switch elements.

9. The apparatus of claim 8 wherein said master power switch generates switch signals corresponding to said abbreviated user command.

10. The apparatus of claim 2 wherein said abbreviated command is a power-on command and said relay means is actuated with respect to each said output to said second state in which each said output is electrically connected to said power source.

11. The apparatus of claim 2 wherein said abbreviated command is a power-off command and said stored switch signals and their sequence are read to actuate said relay means with respect to each said output in the reverse order to said first state in which each said output is electrically disconnected from said power source.

12. The apparatus of claim 2 wherein said relay means comprises a relay switch associated with each said output for electrically connecting and electrically disconnecting a first said conductive line to each of said outputs and a master relay connected to each said relay switch for controlling the state of each said relay switch.

13. The apparatus of claim 2 further comprising a power monitor connected between said power source and said controller means for indicating failure of said power source to said controller means.

14. The apparatus of claim 13 wherein responsive to said power failure indication, said controller means actuates a master relay means which simultaneously disconnects each said output.

15. Power switching apparatus for controlling electrical connection of a power source via conductive lines to each of a plurality of outputs, the apparatus comprising:
    relay circuitry connected in series with said lines for selective actuation, with respect to each said output, between a first power state and a second power state;
    switch circuitry having a plurality of switch elements, with at least one of said switch elements corresponding to each said outputs, operably coupled to said relay circuitry for generating switch signals with respect to each said output responsive to user commands to select from said states with respect to each said output; and
    a controller coupled between said switch circuitry and said relay circuitry responsive to said switch signals for controlling said actuation of said relay circuitry with respect to each said output; storing said switch signals, their sequence and the time delay between their receipt when said switch signals correspond to a user programming command; and, immediately responsive to at least one subsequent switch signal corresponding to an abbreviated user command, reading said stored switch signals, their sequence and time delay therebetween such that said relay circuitry is actuated with respect to each said output in the same order and with the same time delay therebetween as defined by said user programming command.

16. The apparatus of claim 15 wherein said abbreviated command is a power-on command and said relay circuitry is actuated with respect to each said output to said second state in which each said output is electrically connected to said power source.

17. The apparatus of claim 15 wherein said abbreviated command is a power-off command and said stored switch signals and their sequence are read to actuate said relay circuitry with respect to each said output in the reverse order to said first state in which each said output is electrically disconnected from said power source.

18. The apparatus of claim 15 wherein each said output is an A.C. electrical outlet.

19. A method for controlling electrical connection of a power source to each of a plurality of outputs, the method comprising:
    connecting input switches to each said output in a corresponding manner for inputting user programming commands;
    generating switch signals responsive to said user programming commands input with said input switches, for switching each said output, relative to said power source, between a first power state and a second power state;
    storing said switch signals, their sequence and the time delay between their generation; and
    responsive to a user power-on command, reading said stored switch signals, sequence and time delay and switching each said output from said first power state to said second power state in an order and with a time delay therebetween as defined by said stored sequence and time delay.

20. The method of claim 19 further comprising:
    responsive to a user power-off command, reading said stored switch signals and sequence for switching each said output from said second power state to said first power state in an order which is the reverse of said stored sequence.

21. The method of claim 19 wherein in said first power state, said output is electrically disconnected from said power source.

22. The method of claim 19 wherein in said second power state, said output is electrically connected to said power source.

23. A method for controlling electrical connection of a power source via conductive lines to each of a plurality of outputs, the method comprising:
    connecting relays in series with said lines for selective actuation, with respect to each said output, between a first state and a second state;

connecting input switches to each said output in a corresponding manner for inputting user commands;

generating switch signals responsive to said user commands input with said input switches, to switch said state with respect to each said output;

storing said switch signals, sequence and the time delay between their generation when said switch signals correspond to said user commands;

responsive to a subsequent switch signal corresponding to an abbreviated user command, reading said stored switch signals, their sequence and time delay and immediately generating control signals therefrom to switch said state with respect to each said output in an order and with a time delay therebetween as defined by said sequence and time delay.

24. The method of claim 23 wherein said abbreviated command is a power-on command and said relays are actuated with respect to each said output to said first state in which each said output is electrically connected to said power source.

25. The method of claim 23 wherein said abbreviated command is a power-off command and said relays are actuated with respect to each said output in the reverse order to said second state in which each said output is electrically disconnected from said power source.

* * * * *